United States Patent [19]
Mortensen

[11] Patent Number: 6,106,429
[45] Date of Patent: Aug. 22, 2000

[54] THRUST WASHER FOR A PLANETARY GEAR ASSEMBLY

[75] Inventor: Eric H. Mortensen, Peoria, Ill.

[73] Assignee: Caterpillar Inc., Peoria, Ill.

[21] Appl. No.: 09/313,157

[22] Filed: May 17, 1999

[51] Int. Cl.[7] .................................................. F16H 57/08
[52] U.S. Cl. ............................................................ 475/331
[58] Field of Search ............................................. 475/331

[56] References Cited

U.S. PATENT DOCUMENTS

| | | | |
|---|---|---|---|
| 4,776,237 | 10/1988 | Premiski et al. | 74/750 R |
| 5,176,591 | 1/1993 | Krisher | 475/252 |
| 5,205,797 | 4/1993 | Kobayashi et al. | 475/221 |
| 5,489,255 | 2/1996 | Hinckley et al. | 384/620 |
| 5,624,346 | 4/1997 | Hirota | 475/249 |
| 5,713,812 | 2/1998 | Hiraishi et al. | 475/252 |
| 5,727,430 | 3/1998 | Valente | 74/650 |
| 5,728,025 | 3/1998 | Ishikawa et al. | 475/252 |
| 5,730,679 | 3/1998 | Ichiki | 475/252 |
| 5,749,803 | 5/1998 | Teraoka et al. | 475/249 |
| 5,839,985 | 11/1998 | Teraoka | 475/90 |
| 5,928,105 | 7/1999 | Taha et al. | 475/331 |

*Primary Examiner*—Dirk Wright
*Attorney, Agent, or Firm*—Howard & Howard Attorneys; Jeffrey L. Myers

[57] ABSTRACT

A planetary gear assembly includes a sun gear, a ring gear, and more than one planet gear. The sun gear provides rotational input to the gear assembly and intermeshes with the planet gears. The planet gears intermesh with and drive the ring gear. Each of the planet gears have a central bore for receiving a planet pin. The planet pins are supported by the carrier. The planetary gear assembly also includes at least one thrust washer having a plurality of wear surfaces for engaging thrust surfaces on each of the planet gears. The wear surfaces are integrally interconnected by rigid connecting portions to form a single piece washer capable of supporting a thrust load from all of the planet gears. The rigid connecting portions also prevent the thrust washer from rotating with respect to the planet gears.

16 Claims, 3 Drawing Sheets

THRUST WASHER FOR A PLANETARY GEAR ASSEMBLY

TECHNICAL FIELD

This invention generally relates to planetary gear assembly and, more particularly to a planetary gear assembly using a pair of single piece thrust washers, located on opposite sides of the planetary gears, to accommodate thrust loads.

BACKGROUND ART

Planetary gear systems are used to provide gear reduction in a machine driveline. Planetary gear assemblies receive input from a drive shaft, which is typically splined to a sun gear. The sun gear is used to drive a plurality of planet gears spaced about the sun gear. The planetary gears are supported by a carrier.

Each of the planet gears is in meshing engagement with a ring gear. The sun gear drives the planet gears resulting in the planet gears driving the ring gear. The output from the ring gear is used to drive a member such as a wheel, for example.

Typically, planetary gear assemblies use multiple thrust washers to accommodate thrust loading supplied by the sun gear to the planet gears. A pair of thrust washers is supported on each of the planet gears. A first thrust washer is supported on one side of the planet gear and a second thrust washer is supported on an opposite side of the planet gear. Thus, if a planetary gear assembly includes three (3) planet gears, a total of six (6) thrust washers are required.

The thrust washers act as wear surfaces, protecting the planet carrier from wear due to thrust loads and rotation of the planet gears. Each of these thrust washers is typically held in place by a tab or pin that engages the planet carrier to prevent the washer from rotating with respect to the planet gears. These tabs or pins can wear into the carrier causing damage. In some instances the tabs or pins can break-off, causing pieces to enter the gear mesh, which can result in considerable damage to the gear drive.

Thus, it is desirable to have a planetary gear system that eliminates the pins and tabs required to prevent thrust washers from rotation with respect to the planet gears. Also, it is desirable to reduce the number of thrust washer members required in the planetary gear assembly to reduce cost and assembly time. Reduction of parts and elimination of the tabs will significantly decrease maintenance costs.

The present invention is directed to overcoming one or more of the problems set forth above.

DISCLOSURE OF THE INVENTION

In one aspect of this invention, a planetary gear assembly is disclosed. The planetary gear assembly includes a carrier, a plurality of planet gears supported by the carrier, each of the planet gears having a first thrust surface, and a thrust washer having a plurality of wear surfaces for engaging the thrust surface on each of the planet gears, the wear surfaces are interconnected by rigid connecting portions such that the thrust washer cannot rotate with respect to the planet gears.

In another aspect of this invention, a method of assembling a planetary gear assembly is disclosed. The method includes the steps of providing a carrier and a plurality of planet gears, each planet gear having a first thrust surface and a second thrust surface, providing a plurality of mounting portions on the carrier, each mounting portion for supporting one planet gear, installing a first single piece thrust washer with a wear surface for simultaneously engaging the first thrust surfaces on the planet gears, and installing a second single piece thrust washer with a wear surface for simultaneously engaging the second thrust surfaces on the planet gears where the first and second single piece thrust washers are capable of supporting a thrust load from all of the planet gears.

BRIEF DESCRIPTION OF THE DRAWINGS

For a better understanding of the present invention, reference may be made to the accompanying drawings in which.

BEST MODE FOR CARRYING OUT THE INVENTION

Figure 1:
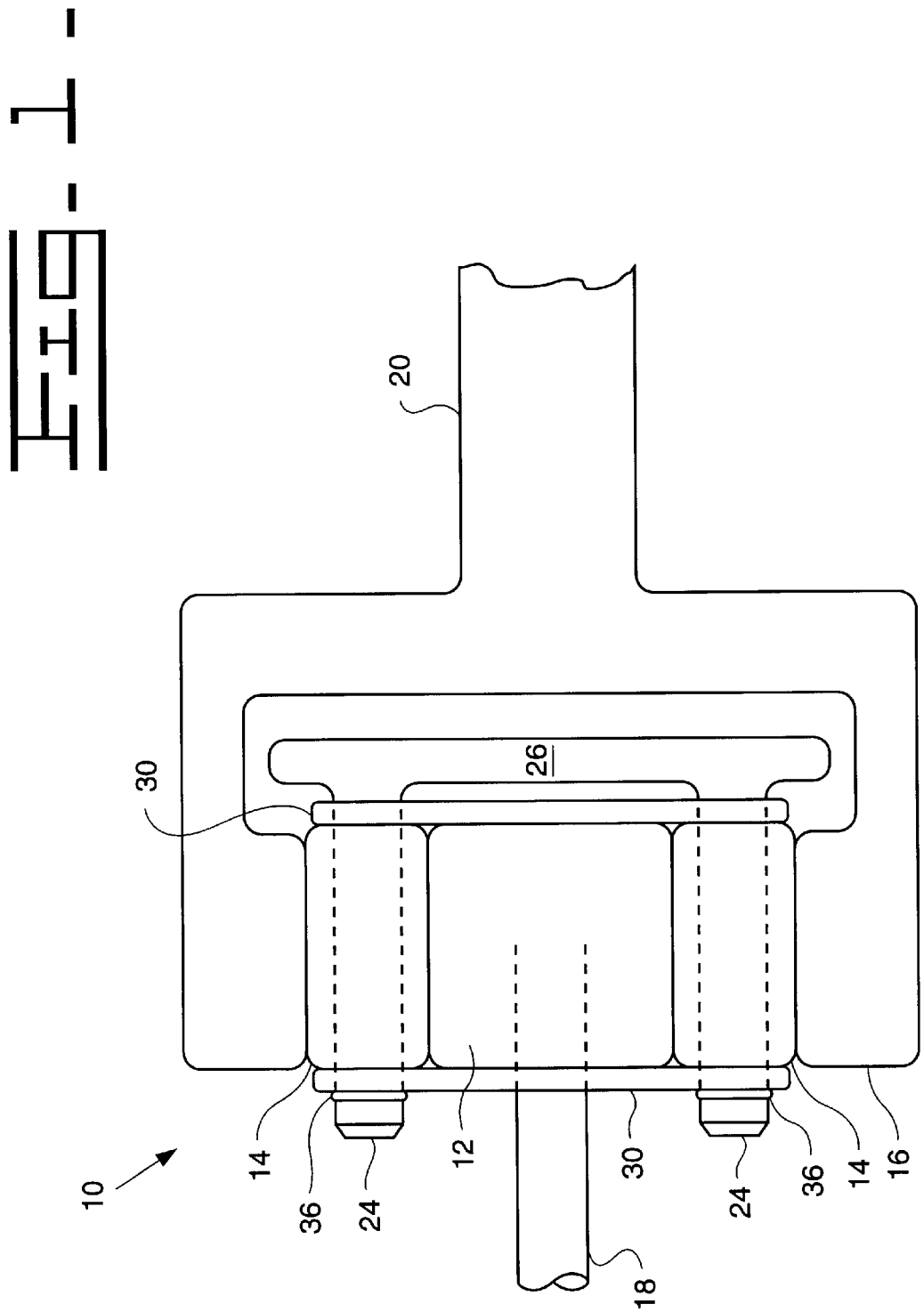
FIG. 1 is a side cross-sectional view of a planetary gear system incorporating the subject thrust washer.

Referring now to the drawings and initially to FIG. 1, which illustrates a planetary gear assembly 10. The planetary gear assembly 10 can be used in any application where a planetary gear reduction is required. Preferably, the planetary gear assembly is incorporated into an axle wheel end for providing a gear reduction at the wheel of a machine.

The planetary gear assembly 10 includes a sun gear 12 and a plurality of planet gears 14 in meshing engagement with the sun gear 12. The planet gears 14 are spaced apart from one another about the sun gear 12. Preferably, three (3) planet gears 14 are driven by the sun gear 12, however, more or less planet gears 14 could be used.

The planet gears 14 are in constant meshing engagement with a ring gear 16. An input shaft 18 provides rotational input to the sun gear 12, which in turn drives the planet gears 14. The planet gears 14 drive the ring gear 16, which in turn drives an output 20. The output 20 could be a shaft, a wheel, or any similar type of output known in the art.

Figure 2:
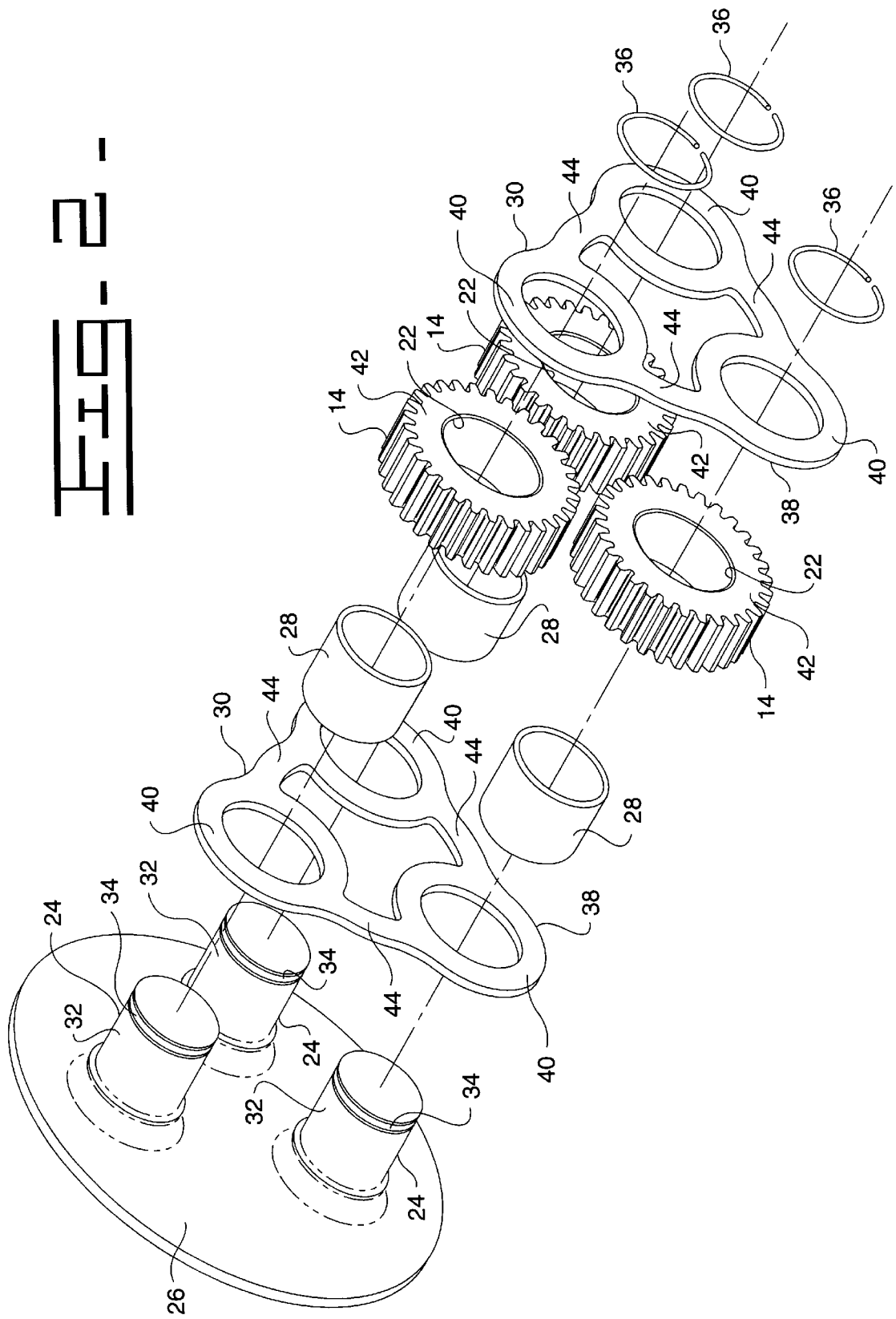
FIG. 2 is an exploded view of the planetary gear system shown in FIG. 1.

Each planet gear 14 includes a central bore 22 for receiving a planet pin 24, see FIG. 2. The planet pins 24 are supported on a carrier 26. In the preferred embodiment, the planet pins 24 are integrally formed with the carrier 26, as shown in FIG. 2, such that the pins 24 and carrier 26 rotate together. A bearing support member 28 can also be mounted on the pins 24 to provide a bearing surface for the planet gears 14.

A thrust washer 30 is used to accommodate thrust loading supplied by the sun gear 12 to the planet gears 14. Preferably, the planetary gear assembly 10 includes a pair of thrust washers 30, located on opposite sides of the planet gears 14. The thrust washers 30 act as wear surfaces, protecting the planet carrier 26 from wear due to thrust loads and rotation of the planet gears 14.

Each of the planet pins 24 includes a cylindrical main body 32 with a narrower neck portion 34. A retaining member 36 is received in the neck 34 to prevent the thrust washer 30 mounted on the exterior side of the planet gears 14 from moving in an axial direction. Preferably, the retaining member 36 is a snap ring, however, other retaining members known in the art could also be used.

Figure 3:
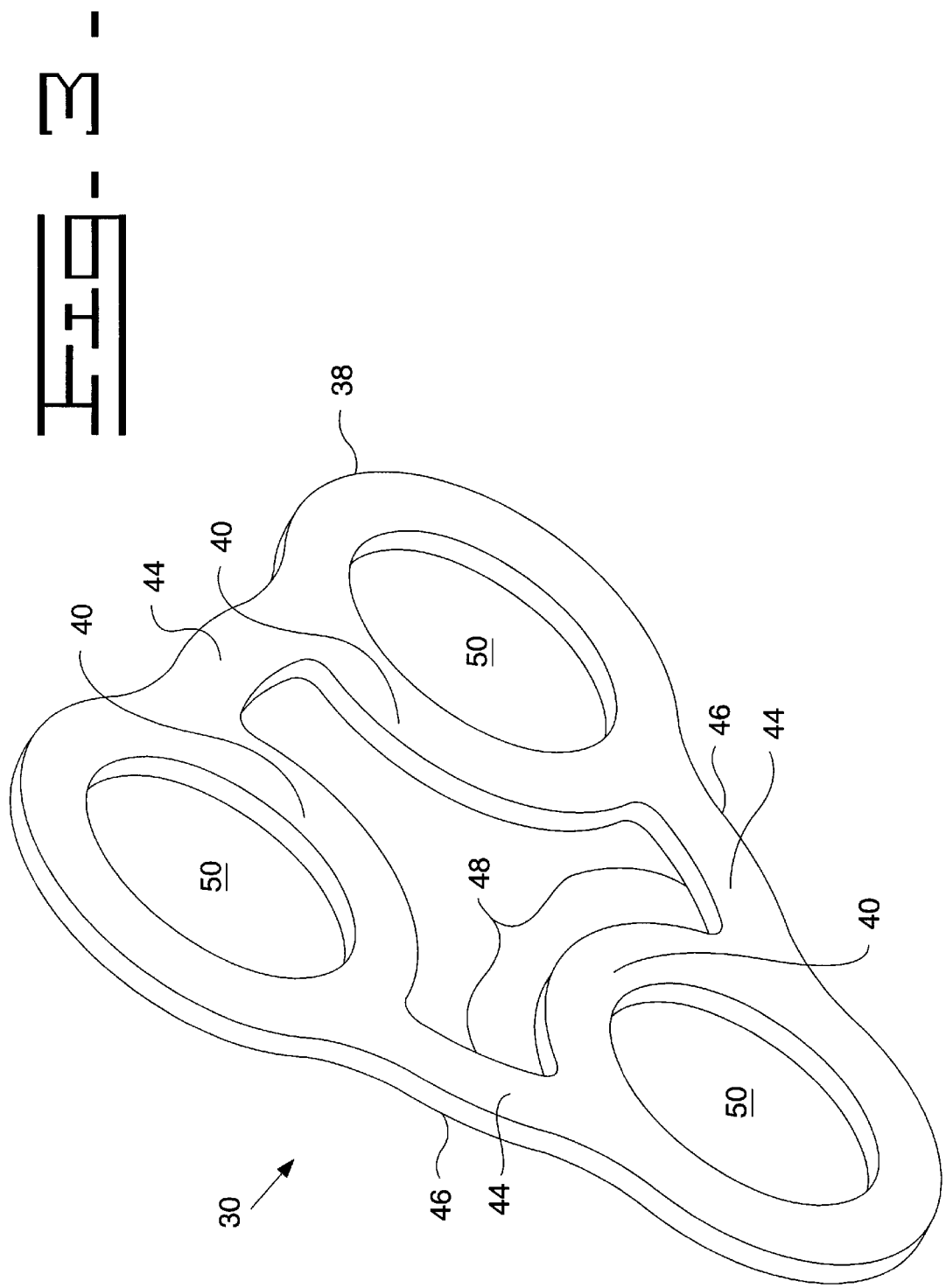
FIG. 3 is a magnified perspective view of the thrust washer shown in FIG. 2.

A thrust washer 30 is shown in greater detail in FIG. 3. Each thrust washer 30 includes a main body 38 and a plurality of engagement or wear surfaces 40. The wear surfaces 40 engage thrust surfaces 42 on each of the planet gears 14, as shown in FIG. 2. The wear surfaces 40 are interconnected by rigid portions 44 to form a single piece main body. The wear surfaces 40 are circumferentially spaced about the body with each of the wear surfaces 40 being located directly over one of the planet gears 14.

The thrust washer 30 is preferably a generally ring-shaped band defined by an outer perimeter 46 and an inner perimeter 48. The central opening of the ring-shaped band, defined by the inner perimeter 48, allows the thrust washers 30 to be inserted over the sun gear 12. The wear surfaces 40 are also preferably ring-shaped and extend partially beyond the outer perimeter 46 and partially beyond the inner perimeter 48 of the ring-shaped band. In other words, the wear surfaces 40 protrude outwardly and inwardly with respect to the overall general shape of the thrust washer 30. It should be understood that the term "ring-shaped" is not limited to a circular shape and includes oval or other elliptical shaped members. Additionally, the washer 30 could be formed as a triangular or other polygonal shaped member.

The washers 30 are preferably made out of steel and are heat treated to a hardness level close to that of the planet gears 14. While steel is the preferred material, other washer materials known in the art could also be used.

As discussed above, each of the wear surfaces 40 is supported on a thrust surface 42 on each planet gear 14. Each wear surface 40 includes a circular opening 50 that is slid over the planet pin 24. The planet gears 14 are sandwiched between the thrust washers 30 and the retaining members 36 are installed to keep the planetary gear assembly 10 together.

The thrust washer 30 is formed as a single piece washer that simultaneously accommodates the thrust loads from each of the planet gears 14. The rigid portions 44 prevent the washer 30 from rotating with respect to the planet gears 14. This prevents premature wear of the components.

The single piece thrust washers 30 placed on opposite sides of the planet gears 14 eliminate the need for multiple thrust washers at each planet gear 14. The ring-shaped design with the rigid interconnecting portions 44 also prevents the washers 30 from rotating with respect to the planet gears 14 so that pins and tabs do not have to be used.

INDUSTRIAL APPLICABILITY

The planetary gear assembly with the unique single piece thrust washer is preferably used in drive axle wheel ends for front end loaders or other heavy duty off-road machines requiring gear reduction at the wheels. However, the thrust washer can be used in other applications requiring a planetary drive. For example, the thrust washer can be used in a transmission with a planetary drive or can be used in an excavator drive to articulate the machine.

This unique planetary gear configuration with a single piece thrust washer reduces the number of required parts and improves assembly. The unique thrust washer also decreases maintenance time and costs by eliminating tabs and pins used to prevent traditional thrust washers from rotating with respect to the planet gears.

The description given above discloses the currently preferred embodiments of this invention. Variations and modifications to the disclosed embodiments may become apparent to those skilled in the art that do not necessarily depart from the purview and spirit of this invention.

Other aspects, objects and advantages of the present invention can be obtained from a study of the drawings, the disclosure and the appended claims.

What is claimed is:

1. A planetary gear assembly comprising:

a carrier;

a plurality of planet gears supported by said carrier, each of said planet gears having a first thrust surface;

a thrust washer having a plurality of wear surfaces for engaging said thrust surface on each of said planet gears, said wear surfaces are interconnected by rigid connecting portions such that said thrust washer cannot rotate with respect to said planet gears;

said wear surfaces and said rigid connecting portions are integrally connected to form a single piece thrust washer; and said single piece thrust washer is defined by a ring-shaped main body and said wear surfaces are defined by a plurality of ring-shaped portions circumferentially spaced about said main body, each of said ring-shaped portions being supported on one side of one of said planet gears.

2. The assembly of claim 1, wherein each of said planet gears include a central bore for receiving a planet pin supported by said carrier.

3. The assembly of claim 1, including a sun gear for supplying rotational input to said planet gears and a ring gear for receiving rotational output from said planet gears.

4. The assembly of claim 1, including a second thrust washer located on an opposite side of said planet gears, said thrust washers for accommodating thrust loads on both sides of said planet gears wherein each of said thrust washers is a single piece member simultaneously engaged by each of said planet gears.

5. A planetary gear assembly comprising:

a carrier;

a plurality of planet gears supported by said carrier, each of said planet gears having a first thrust surface;

a thrust washer having a plurality of wear surfaces for engaging said thrust surface on each of said planet gears, said wear surfaces are interconnected by rigid connecting portions such that said thrust washer cannot rotate with respect to said planet gears;

said wear surfaces and said rigid connecting portions are integrally connected to form a single piece thrust washer;

said single piece thrust washer is defined by a ring-shaped main body and said wear surfaces are defined by a plurality of ring-shaped portions circumferentially spaced about said main body, each of said ring-shaped portions being supported on one side of one of said planet gears; and said ring-shaped portions partially extend beyond a perimeter defined by said main body.

6. A planetary gear assembly comprising:

a carrier;

a plurality of planet gears supported by said carrier, each of said planet gears having a first thrust surface;

a thrust washer having a plurality of wear surfaces for engaging said thrust surface on each of said planet gears, said wear surfaces are interconnected by rigid connecting portions such that said thrust washer cannot rotate with respect to said planet gears;

each of said planet gears include a central bore for receiving a planet pin supported by said carrier; and each of said planet pins include a cylindrical main body with a neck for receiving a retaining member to prevent axial movement of said thrust washer.

7. A planetary gear assembly comprising:

a carrier:

a plurality of planet gears supported by said carrier, each of said planet gears having a first thrust surface;

a thrust washer having a plurality of wear surfaces for engaging said thrust surface on each of said planet gears, said wear surfaces are interconnected by rigid connecting portions such that said thrust washer cannot rotate with respect to said planet gears;

each of said planet gears include a central bore for receiving a planet pin supported by said carrier;

each of said planet pins include a cylindrical main body with a neck for receiving a retaining member to prevent axial movement of said thrust washer; and said planet pins are integrally connected to said carrier.

8. A thrust washer for accommodating a thrust load supplied by an input to a planetary gear assembly comprising:

a main body:

a plurality of engagement surfaces spaced apart from one another around said main body, each of said engagement surfaces for receiving a thrust load from a planetary member; and rigid connecting portions for interconnecting said engagement surfaces such that said engagement surfaces do not rotate with respect to the planetary member; and each of said engagement surfaces surrounds an opening for receiving a planetary support member.

9. The washer of claim 8, wherein said main body is integrally formed with said connecting portions to form a single piece thrust washer.

10. A thrust washer for accommodating a thrust load supplied by an input to a planetary gear assembly comprising:

a main body;

a plurality of engagement surfaces spaced apart from one another around said main body, each of said engagement surfaces for receiving a thrust load from a planetary member; and rigid connecting portions for interconnecting said engagement surfaces such that said engagement surfaces do not rotate with respect to the planetary member; and said main body is a ring-shaped band defined by an inner perimeter and an outer perimeter and each of said engagement surfaces is defined by a ring-shaped portion that extends partially beyond said outer perimeter and partially beyond said inner perimeter.

11. A planetary gear assembly comprising:

a carrier;

a plurality of planet gears each including a central bore for receiving a planet pin supported by said carrier, said planet gears each having a first thrust surface; and a thrust washer having a plurality of wear surfaces for engaging said thrust surfaces wherein said wear surfaces are integrally interconnected by rigid connecting portions to form a single piece washer capable of supporting a thrust load from all of said planet gears;

a sun gear in meshing engagement with said planet gears for supplying rotational input to said planet gears and a ring gear in meshing engagement with said planet gears for receiving rotational output from said planet gears;

a second thrust washer having a plurality of second wear surfaces for engaging second thrust surfaces located on an opposite side of each of said planetary gears from said first thrust surface wherein said second wear surfaces are integrally interconnected by second rigid connecting portions to form a second single piece washer capable of supporting a thrust load on said opposite side of said planet gears; and said first and second thrust washers are defined by a ring-shaped band having a center opening and a plurality of apertures circumferentially spaced around said center opening, said apertures for receiving said planet pins.

12. A planetary gear assembly comprising:

a carrier;

a plurality of planet gears each including a central bore for receiving a planet pin supported by said carrier, said planet gears each having a first thrust surface; and a thrust washer having a plurality of wear surfaces for engaging said thrust surfaces wherein said wear surfaces are integrally interconnected by rigid connecting portions to form a single piece washer capable of supporting a thrust load from all of said planet gears;

a sun gear in meshing engagement with said planet gears for supplying rotational input to said planet gears and a ring gear in meshing engagement with said planet gears for receiving rotational output from said planet gears;

a second thrust washer having a plurality of second wear surfaces for engaging second thrust surfaces located on an opposite side of each of said planetary gears from said first thrust surface wherein said second wear surfaces are integrally interconnected by second rigid connecting portions to form a second single piece washer capable of supporting a thrust load on said opposite side of said planet gears; and said first and second thrust washers are defined by a ring-shaped band having a center opening and a plurality of apertures circumferentially spaced around said center opening, said apertures for receiving said planet pins; and each of said planet pins includes a cylindrical body with a neck for receiving a retaining member, said retaining member for holding said thrust washers in an axially fixed position.

13. A method of assembling a planetary gear assembly comprising the steps of:

providing a carrier and a plurality of planet gears, each planet gear having a first thrust surface and a second thrust surface;

providing a plurality of mounting portions on the carrier, each mounting portion for supporting one planet gear;

installing a first single piece thrust washer with a wear surface for simultaneously engaging the first thrust surfaces on the planet gears; and installing a second single piece thrust washer with a wear surface for simultaneously engaging the second thrust surfaces on the planet gears where the first and second single piece thrust washers are defined by a ring-shaped band having a plurality of apertures circumferentially spaced around said mounting portions and are capable of supporting a thrust load from all of the planet gears.

14. A method as set forth in claim 13 including the step of retaining the first and second single piece thrust washers in an axially fixed position with a retaining member.

15. A method as set forth in claim 13 including the step of integrally forming the mounting portions on the carrier.

16. A method as set forth in claim 13 including the step of circumferentially spacing the planet gears about a centrally located sun gear.

* * * * *